United States Patent [19]

Yukang et al.

[11] Patent Number: 5,358,918
[45] Date of Patent: Oct. 25, 1994

[54] HYDROCARBON CONVERSION CATALYST FOR PRODUCING HIGH QUALITY GASOLINE AND $C_3$ AND $C_4$ OLEFINS

[75] Inventors: Lu Yukang; Huo Yongqing; Shu Xingtian; Wang Yousheng; Wang Zeyu; Zhang Shuqin; Liu Haibin; Cui Suxin, all of Beijing, China

[73] Assignees: China Petro-Chemical Corporation; Research Institute of Petroleum Processing, Sinopec, both of Beijing, China

[21] Appl. No.: 30,579

[22] Filed: Mar. 12, 1993

[30] Foreign Application Priority Data

Oct. 22, 1992 [CN] China .............. 92111446.X

[51] Int. Cl.⁵ ........................... B01J 29/06
[52] U.S. Cl. ........................... 502/67; 502/68
[58] Field of Search ............... 502/67, 68

[56] References Cited

U.S. PATENT DOCUMENTS

| | | | |
|---|---|---|---|
| 3,758,403 | 9/1973 | Rosinski | 208/120 |
| 3,804,747 | 4/1974 | Kimberlin, Jr. et al. | 502/67 |
| 4,239,654 | 12/1980 | Gladrow et al. | 502/67 |
| 4,242,237 | 12/1980 | Gladrow et al. | 252/455 Z |
| 4,289,606 | 9/1981 | Gladrow et al. | 208/120 |
| 4,486,296 | 12/1984 | Oleck et al. | 502/67 |
| 4,612,298 | 9/1986 | Hettinger et al. | 502/65 |
| 4,880,787 | 11/1989 | Bundens et al. | 502/65 |
| 5,008,000 | 4/1991 | Marcilly et al. | 502/67 |
| 5,232,675 | 8/1993 | Shu et al. | 423/328.1 |

FOREIGN PATENT DOCUMENTS 0020154 5/1980 European Pat. Off.
0229609 1/1987 European Pat. Off.

Primary Examiner—Carl F. Dees
Attorney, Agent, or Firm—Willian Brinks Hofer Gilson & Lione

[57] ABSTRACT

A hydrocarbon conversion catalyst for converting petroleum distillates of different boiling ranges, residue oils, and crude oils, especially the heavy hydrocarbons containing high nickel, into high quality gasoline and $C_3$ and $C_4$ olefins. The catalyst of the invention comprises three zeolitic active components consisting of a rare-earth-containing pentasil type high silica zeolite ZRP, a REY zeolite, and a high silica Y zeolite, in a total content of 10–40 wt % based on the total weight of the catalyst, and the remainder synthetic matrix or semi-synthetic matrix comprising 10–40 wt % silica and/or alumina binder. In the total amount of the active components, zeolite ZRP, REY, and the high silica Y are 3–50, 12–75, and 12–75 wt % respectively. The zeolite ZRP used in the catalyst is characterized in an anhydrous chemical composition of the formula $0.01-0.30\ RE_2O_3.0.4-1.0\ Na_2O.Al_2O_3.20-60\ SiO_2$, a specific X-ray diffraction pattern, a higher adsorption capacity ratio of normal hexane to cyclohexane, and a rare earth ingredient which originates from a rare earth containing faujasite used as seed in the synthesis of the zeolite.

19 Claims, No Drawings

HYDROCARBON CONVERSION CATALYST FOR PRODUCING HIGH QUALITY GASOLINE AND $C_3$ AND $C_4$ OLEFINS

FIELD OF THE INVENTION

This invention generally relates to a catalyst for petroleum hydrocarbon conversion, and more specifically relates to a multi-zeolite components based catalyst for producing high quality gasoline and $C_3$ and $C_4$ olefins.

DESCRIPTION OF THE PRIOR ART

Conventionally, the catalytic methods used for producing gasoline and $C_3$ and $C_4$ olefins are catalytic cracking and deep catalytic cracking technology. The main purpose of the deep catalytic cracking technology is to increase the production of the light olefins. The $C_2$–$C_4$ olefin yield from the deep catalytic cracking carl attain a level of about 50 wt %, whereas the liquid products have rather poor stabilities. Although the gasoline yield of the conventional catalytic cracking can attain a level as high as 50%, its $C_3$ and $C_4$ olefin yield is usually less than 10 wt %. Moreover, the gasoline octane number can not meet the requirement for producing a blending gasoline commodity. For enhancing the octane number of the cracking gasoline and improving the distribution of the cracking products, many researchers have reported the application of a ZSM-5 promoter combined with the cracking catalyst, and the direct use of a dual zeolite components based catalyst containing ZSM-5. For example, U.S. Pat. No. 3,758,403 discloses the adding a ZSM-5 promoter catalyst to a that contains a zeolite with a pore diameter larger than 7 Å. The addition of the ZSM-5 promoter enhances the gasoline octane number and the $C_3$ and $C_4$ olefin yield in the cracking products. In particular, when 5–10 wt % HZSM-5 is added to a REY based cracking catalyst, using a feed of gas oil with a boiling range of 204°–316° C., under operating conditions of 482°–486° C., LHSV of 4, and cat./oil ratio of 1.5, the yield of $C_5+$ gasoline is 46.4–55.3 vol. %, the octane number RON+3 of $C_5+$ gasoline and alkylate is 97.5–98.6, the $C_3$ and $C_4$ olefin yield is 19.8–24.7 vol %, U.S. Statutory Invention Registration H499 also reveals the application of a mixture of an oxide imbeded ZSM-5 zeolite and an oxide imbeded USY zeolite as a catalyst composite to enhance the octane number of gasoline product.

In EP 020.154, a USY and ZSH-5 dual zeolite component based catalyst is used to increase the gasoline octane number and $C_3$ and $C_4$ olefins. The total zeolite content of the USY/ZSM-S catalyst is 20 wt %. When the content of ZSM-5 zeolite is 2–5 wt % using a feed of a vacuum gas oil with a boiling range of 293°–566° C. under operating conditions of 496° C., and cat./oil ratio of 4, the $C_5+$ gasoline yield is 53–55.5 vol %, the research octane number(RON) of gasoline is 94.4–94.8, the motor octane number(MON) of gasoline is 80.9–81.2., the yield of $C_3$ olefin is 4.7–5.4 wt %, and the yield of $C_4$ olefin is 8.4–10.6 vol %.

The purpose of the present invention is to provide a novel multi-zeolite components based catalyst and a process for using the catalyst of the invention to convert petroleum fraction, residue oil, or crude oil, with various boiling ranges, into a higher yield of $C_3$ and $C_4$ olefins and high quality gasoline.

The other purposes of the invention are given in the specification including the claims.

SUMMARY OF THE INVENTION

A catalyst for converting petroleum hydrocarbons into high quality gasoline and $C_3$ and $C_4$ olefins, comprises 10–40 wt % of three zeolities as active components, i.e., a rare-earth-containing high silica zeolite having the structure of pentasil (hereinafter designated as ZRP), a rare earth Y zeolite(REY), and a high silica Y zeolite, based on the total weight of the catalyst, and the remainder of the catalyst consisting of a synthetic matrix or semisynthetic matrix containing 10–40 wt % (based on the total weight of the catalyst) of silica and/or alumina binder. In the total weight of the active components, ZRP zeolite is 3–50 wt %, REY and the high silica Y zeolite are each 12–75 wt %.

DETAILED DESCRIPTION OF THE INVENTION

The catalyst according to the present invention includes 10–40 wt % (based on the total weight of the catalyst) of an active component comprising, ZRP, REY, and high silica Y zeolites. The remainder of the catalyst consists of a synthetic matrix or a semi-synthetic matrix containing 10–40 wt % (based on the total weight of the catalyst) of silica and/or alumina binder. In the total weight of the active components, ZRP zeolite is 3–50 wt %, REY and the high silica Y zeolite are each 12–75 wt %.

The ZRP zeolite used in the present invention is disclosed by the applicants in U.S. patent application Ser. No. 07/820,385 (filed on Jan.14, 1992), now U.S. Pat. No. 5,232,675 or European series number 92200061.7 (filed on Jan.11. 1992), as a rare-earth-containing high silica zeolite having the structure of pentasil with an anhydrous chemical composition of (based on the moles of the oxides) the formula: 0.01–0.30 $RE_2O_3.0.4$–1.0 $Na_2O.Al_2O_3.20$–60 $SiO_2$. This ZRP zeolite possesses an X-ray diffraction pattern listed in Table 1. In addition the ZRP zeolite has a narrower pore opening than that of HZSM-5 zeolite, as evidenced by a 2–4 times higher adsorption capacity ratio of normal hexane to cyclohexane. The rare earth ingredient of the zeolite originates from a rare earth containing faujasite used as seed in the synthesis of ZRP zeolite. The ZRP zeolite used in the present invention is preferably an H-type. The crystallite size of the ZRP zeolite used in the invention is 2–3 u.

The REY zeolite in the present invention is prepared by rare earth exchange of a NaY zeolite which may be followed by a calcination. The resulting zeolite contain 5–19 wt % rare earth (calculated as $RE_2O_3$), and has a crystallite size of 0.5–10 u, preferably 0.8–2 u.

The high silica Y zeolite may be prepared and stabilized by various chemical and/or physical methods, such as hydrothermal method, acid-treatment methods, framework silicon-enriching and dealuminating method, and $SiCl_4$-treatment method etc.. The high silica Y zeolite possesses a $Na_2O$ content of less than 4 wt %, preferably 1 wt %, a unit cell size of less than 24.5 A, a silica/alumina ($SiO_2/Al_2O_3$) ratio of 8–15 or higher, and a crystallite size of 0.5–10 u, preferably 0.8–2 u.

The synthetic matrix used in the present invention is an amorphous sillca-alumina or silica-magnesia with a $SiO_2$ content of no more than 70 wt %, prepared by a co-gel method or a stepwise precipitation method. An appropriate amount of clay may also be added to the synthetic matrix for adjusting the bulk density of the catalyst.

The semi-synthetic matrix used in the present invention consists of the clays used conventionally for cracking catalyst, such as kaolin and halloysite, and a binder selected from $Al_2O_3$, $SiO_2$, and $SiO_2$-$Al_2O_3$. When a synthetic matrix is used for the preparation of the catalyst according to the invention, the zeolites ZRP, REY, and high silica Y are mixed together according to a given proportion to prepare a slurry, in which an amorphous silica-alumina or silica-magnesia slurry prepared by the co-gel method or stepwise precipitation method is added, followed by homogenizing, shaping, washing and drying.

TABLE 1

X-ray diffraction pattern of the zeolite ZRP

| As-synthesized ZRP | | Hydrogen ZRP | |
|---|---|---|---|
| d (A) | 100 $I/I_o$ | d (A) | 100 $I/I_o$ |
| 11.17 | 40 | 11.18 | 37 |
| 10.01 | 35 | 10.01 | 40 |
| 9.76 | 12 | 9.75 | 10 |
| 7.45 | 4 | 7.44 | 3 |
| 7.08 | 1.5 | 7.09 | 1.5 |
| 6.71 | 6 | 6.72 | 3.5 |
| 6.37 | 8 | 6.37 | 7 |
| 6.01 | 11 | 6.00 | 11 |
| 5.72 | 10 | 5.71 | 8 |
| 5.58 | 10 | 5.58 | 9 |
| 5.37 | 3 | 5.38 | 2 |
| 5.15 | 3 | 5.14 | 3 |
| 5.04 | 5 | 5.05 | 5 |
| 4.985 | 8 | 4.983 | 8 |
| 4.621 | 6 | 4.620 | 6 |
| 4.366 | 10 | 4.369 | 7 |
| 4.267 | 13 | 4.265 | 12 |
| 4.090 | 5 | 4.085 | 2 |
| 4.010 | 9 | 4.010 | 7 |
| 3.861 | 100 | 3.856 | 100 |
| 3.819 | 74 | 3.817 | 72 |
| 3.755 | 41 | 3.752 | 36 |
| 3.720 | 49 | 3.719 | 39 |
| 3.650 | 28 | 3.652 | 26 |
| 3.591 | 7 | 3.593 | 4 |
| 3.481 | 9 | 3.479 | 6 |
| 3.447 | 13 | 3.447 | 11 |

When a semisynthetic matrix is used, the preparation of the catalyst according to the invention is as follows: the precursor of a binder selected from aluminum sol, pseudobohmite gel, silica sol, and silica-alumina sol, is mixed with a slurry of clay according to a given proportion to prepare a homogeneous mixture. An aging step may follow. A mixed zeolite slurry of ZRP, REY, and the high silica Y is further added, followed by homogenizing, shaping, washing, and drying. To further reduce the content of alkali metal (such as Na), an aqueous solution containing $H^+$ or $NH_4^+$ can be used for washing.

The catalyst of the invention is suitable for processing petroleum fractions, residue oils, and crude oils, with various boiling ranges, including primary processed distillates, the mixture of two or more of primary processed distillates, primary processed distillate or a mixture of primary processed distillates blended with a part of a secondary processed distillate, and crude oils. The catalyst of the invention has a high capacity for nickel, hence it is especially suitable for processing the heavier hydrocarbons with high nickel content (up to 15 ppm), such as residue oil and heavy hydrocarbon oils blended with secondary processed distillates.

By using the catalyst of the invention, it is possible to obtain a higher yield of $C_3$ and $C_4$ olefins, a high yield of gasoline with high octane number good and stability, and also diesel oil with a quality similar to that from the conventional catalytic cracking. In a pilot plant, the yield of $C_3$ and $C_4$ olefin was 20–30 wt % (based on feedstock, same in the following text), the yield of $C_5^+$ gasoline was 40–55 wt %, Ron (clear) was 91–95,Mon (clear) was 80–84, the induction period was 500–1100 min, and the existent gum was 0–3 mg/100 ml.

For hydrocarbon feeds with different compositions of hydrocarbon types, the relative content of the three zeolite components and the total zeolite content in the catalyst can be adjusted to modify the yield distribution of the products such as $C_3$ and $C_4$ olefins, gasoline, etc. The modification of the product distribution may also be achieved by adjusting the operating conditions of the process.

The catalyst of the invention can also be added gradually, according to the octane number requirement, to the inventory of a running catalytic cracking unit to enhancing the gasoline octane number and $C_3$ and $C_4$ olefin yield. Hence, the application of the catalyst of the invention can meet the different requirements of different types of refineries.

To further illustrate this invention, and not by way of limitation, the following examples are given.

The general properties of the hydrocarbon feeds used in the examples are listed in Table 2.

TABLE 2

| | A | B | C | D | E | F* |
|---|---|---|---|---|---|---|
| density 20° C. g/cm³ | 0.8730 | 0.8612 | 0.8572 | 0.8871 | 0.8672 | 0.7893 |
| Conradson carbon wt % | 0.22 | 2.12 | 0.17 | 0.22 | 3.81 | 0.23 |
| UOP K | 12.5 | 12.6 | 12.1 | 12.0 | 11.9 | — |
| H, wt. % | 13.24 | 13.94 | 13.57 | — | — | — |
| C, wt. % | 86.50 | 85.76 | 85.92 | — | — | — |
| basic nitrogen ppm | 340 | 600 | 357 | — | — | 201 |
| nickel ppm | 0.09 | 3.3 | 0.1 | — | 11.3 | 1.6 |
| vanadium ppm | <0.01 | <0.1 | <0.1 | — | 0.1 | <0.1 |
| distillation °C. | 346–546 | >291 | 243–490 | 243–507 | >308 | — |

*paraffinic base crude oil

EXAMPLES 1–8

In accordance with the present invention a catalyst was prepared having a semi-synthetic matrix that was formed using an aluminum sol as the precursor for the binder.

1200 g aluminum sol (a product of the Catalyst Plant of Qilu Petrochemical Corporation, containing 20 wt % $Al_2O_3$) and 950 g halloysite (a product of Suzhou Porcelain Clay Company with a solid content of 80 wt %) were mixed together homogeneously as the slurry of matrix.

Three zeolites (HZRP, REY, and DASY) were added to decationized water according to given proportions. The HZRP zeolite was (prepared according to Example 8 in U.S. patent application Ser. No. 07/820,385, or European series number 92200061.7. The HZRP had a crystallite size of 2-3 u, which was the same in each of the following examples), REY, and DASY (both were products of the Catalyst Plant of Qilu Petrochemical Corporation, DASY was a high silica Y zeolite with a silica/alumina ratio of 8-9 prepared by a hydrothermal dealumination method). After slurrying and homogenizing the three zeolites, the resulted slurry was mixed with the above-mentioned matrix slurry, followed by homogenizing, spray drying, washing, and drying to obtain the catalyst according to the invention. The detail data are listed in Table 3.

part of the catalyst of Example 1 was contaminated with 3600 ppm nickel and another part was not contaminated with nickel. Both fresh catalyst sample and contaminated catalyst sample were tested in a pilot plant at a capacity of 360 kg/day using feed B as feedstock under operating conditions of 98 Kpa gauge pressure and cat./oil ratio of 8. The reaction temperature and the feeding mode were changed during the test. The results are listed in Table 4.

The contaminated catalyst of Example 1 was also tested in a bench-scale fixed-fluidized bed reactor using the following feed stocks (1) a straight-run gasoline (less than 200° C.), (2) a straight-run diesel (200°-330° C.), feed E (3) containing 11.3 ppm nickel and (4) feed F. The operating conditions were a temperature of 515° C., WHSV of 14 hr$^{-1}$, and cat./oil ratio of 8. The results are listed in Table 5.

The catalyst was also tested in a bench-scale fixed-fluidized bed reactor using feed B as feedstock under operating conditions of 515° C., WHSV of 14 hr$^1$, and cat./oil ratio 4, after a deactivating treatment at 790° C., with 100% atmospheric steam for 17 hrs. The results are listed in Table 6.

The deactivated (the same as mentioned above) catalyst was also tested in a bench-scale fixed-fluidized bed reactor using feed C as feedstock under operating conditions of 530° C. WHSV of 14 hr$^{-1}$ and cat./oil ratio of 8. The results are listed in Table 7.

The catalyst deactivated under a condition of 800° C. and with 100% atmospheric steam for 8 hrs, was tested in a heavy oil—micro reactor using feed D as feedstock under operation conditions of 500° C., WHSV of 16 hr$^{-1}$, and cat./oil ratio of 3. The results are listed in Table 8.

The preparation method of nickel-contaminated catalyst was as follows: according to a proportion of 2.564 kg nickel naphthenate per 50 kg catalyst (7.8 wt % nickel), 2.564 kg nickel naphthenate was dissolved in 50 liter light gas oil, which was steadily pumped into a feeding system within 24 hrs to contact and react with 50 kg catalyst in a riser, after that reactor. Thereafter the same feed not containing nickel naphthenate was contacted with the catalyst for 24 hrs under the same condition as mentioned above, thereby resulting in a catalyst contaminated with 3600 ppm nickel.

TABLE 3

| Example | zeolite weight g | decationized water weight g | HZRP:REY:DASY weight ratio | zeolite content in catalyst wt % |
|---|---|---|---|---|
| 1 | 426 | 514 | 16.6:50:33.4 | 30 |
| 2 | 471 | 565 | 6.4:62.4:31.2 | 32 |
| 3 | 539 | 678 | 14.3:28.6:57.1 | 35 |

TABLE 3-continued

| Example | zeolite weight g | decationized water weight g | HZRP:REY:DASY weight ratio | zeolite content in catalyst wt % |
|---|---|---|---|---|
| 4 | 538 | 646 | 31.4:42.9:25.7 | 35 |
| 5 | 538 | 538 | 25.7:42.9:31.4 | 35 |
| 6 | 539 | 647 | 42.9:42.9:14.2 | 35 |
| 7 | 429 | 515 | 6.8:49.9:43.3 | 30 |
| 8 | 177 | 212 | 13.6:53.1:33.3 | 15 |
| Comparative 1 | 428 | 514 | 0:60:40 | 30 |
| Comparative 2 | 428 | 514 | *40:60:0 | 30 |
| Comparative 3 | 428 | 514 | *23.3:0:76.7 | 30 |

*The zeolite used here was HZSM-5.

TABLE 4

| nickel on catalyst, ppm | 0 | 3600 | 3600 | 3600 | 3600 |
|---|---|---|---|---|---|
| feeding mode | | once through | | | recycle ratio 0.12 |
| reaction temp. C. | 515 | 514 | 529 | 500 | 499 |
| conversion wt % | 89.10 | 87.63 | 88.05 | 83.94 | 86.02 |
| product yield, wt % | | | | | |
| H$_2$—C$_2$ | 2.86 | 3.27 | 4.49 | 2.25 | 2.77 |
| C$_3^0$ | 2.34 | 1.84 | 2.06 | 1.68 | 1.74 |
| nC$_4^0$ | 1.79 | 1.52 | 1.41 | 1.58 | 1.46 |
| iC$_4^0$ | 6.12 | 5.87 | 4.75 | 5.61 | 5.75 |
| C$_3$= | 11.41 | 11.17 | 13.47 | 9.72 | 9.80 |
| E C$_4$= | 13.94 | 13.51 | 15.18 | 13.10 | 11.85 |
| iC$_4$= | 4.86 | 4.35 | 4.87 | 4.03 | 3.75 |
| C$_5^+$ gasoline | 44.18 | 44.52 | 41.24 | 44.85 | 45.89 |
| coke | 6.05 | 6.34 | 5.45 | 5.15 | 6.76 |
| C$_5^+$ gasoline + alkylate, wt % | 94.69 | 93.63 | 98.08 | 89.09 | 88.85 |
| iC$_4^0$ from other source, wt % | 22.59 | 22.42 | 27.02 | 19.60 | 11.71 |
| C$_5^+$ gasoline | | | | | |
| RON (clear) | 93.7 | 92.1 | 92.4 | 94.2 | 92.6 |
| MON (clear) | 81.1 | 79.9 | 80.7 | 81.4 | 81.1 |
| induction period, min | 735 | | 525 | | 825 |
| existent gum, mg/100 ml | 0 | | 2 | | 2 |

TABLE 5

| feed | straight-run gasoline | straight-run diesel | E | F |
|---|---|---|---|---|
| conversion, wt % | 96.71 | 80.68 | 86.99 | 84.45 |
| product yield, wt % | | | | |
| H$_2$—C$_2$ | 1.74 | 2.55 | 2.45 | 3.17 |
| C$_3$—C$_4$ | 29.37 | 30.96 | 27.78 | 28.63 |
| C$_3$= | 6.79 | 7.09 | 9.00 | 8.20 |
| C$_4$= | 5.39 | 5.92 | 9.73 | 6.42 |
| C$_5^+$ gasoline | 61.44 | 38.05 | 45.26 | 42.34 |
| 205-330° C. | 3.29 | } 19.32 | 8.56 | 10.75 |
| >330° C. | 0.0 | | 4.45 | 4.80 |
| coke | 4.16 | 9.12 | 11.50 | 10.31 |

TABLE 6

| catalyst | Example 1 | Example 2 | Example 3 |
|---|---|---|---|
| conversion, wt % | 84.14 | 84.01 | 82.98 |
| product yield, wt % | | | |
| $H_2$—$C_2$ | 2.20 | 2.50 | 2.23 |
| $C_3^0$ | 3.03 | 3.15 | 2.58 |
| $nC_4^0$ | 1.86 | 2.06 | 1.72 |
| $iC_4^0$ | 8.25 | 8.12 | 7.51 |
| $C_3^=$ | 8.60 | 6.70 | 8.99 |
| $\Sigma C_4^=$ | 7.28 | 5.82 | 7.84 |
| $iC_4^=$ | 2.27 | 1.69 | 2.59 |
| $C_5^+$ gasoline | 45.66 | 47.85 | 45.69 |
| coke | 7.26 | 7.81 | 6.42 |
| $C_5^+$ gasoline + alkylates, wt % | 78.73 | 73.90 | 80.00 |
| $iC_4^0$ from other source, wt % | 10.57 | 6.77 | 12.30 |
| *$C_5^+$ gasoline | | | |
| RON(clear) | — | 92.7 | 90.6 | 91.8 |
| MON(clear) | 80.5 | 79.1 | 80.1 |

*do not contain alkylates.

TABLE 7

| catalyst | Example 1 | Example 3 | Example 4 |
|---|---|---|---|
| conversion, wt % | 83.97 | 85.12 | 82.08 |
| product yield, wt % | | | |
| $H_2$—$C_2$ | 2.84 | 2.96 | 2.61 |
| $C_3^0$ | 4.02 | 3.76 | 3.52 |
| $nC_4^0$ | 2.30 | 2.29 | 1.98 |
| $iC_4^0$ | 9.42 | 9.96 | 9.22 |
| $C_3^=$ | 7.91 | 8.15 | 8.82 |
| $\Sigma C_4^=$ | 6.50 | 6.91 | 7.52 |
| $iC_4^=$ | 1.89 | 2.41 | 2.07 |
| $C_5^+$ gasoline | 45.40 | 46.07 | 43.94 |
| coke | 5.62 | 5.02 | 4.47 |
| $C_5^+$ gasoline + alkylates, wt % | 75.20 | 77.60 | 77.80 |
| $iC_4^0$ from other source, wt % | 7.79 | 8.00 | 10.20 |
| *$C_5^+$ gasoline | | | |
| RON(clear) | 95.1 | 93.7 | 94.5 |
| MON(clear) | 82.6 | 81.7 | 82.4 |

*do not contain alkylates.

TABLE 8

| catalyst | Example 5 | Example 6 | Example 7 | Example 8 |
|---|---|---|---|---|
| conversion, wt % | 72.94 | 68.41 | 71.92 | 62.01 |
| product yield, wt % | | | | |
| $H_2$—$C_2$ | 1.22 | 1.10 | 1.24 | 1.08 |
| $C_3^0$ | 0.11 | 0.11 | 0.25 | 2.22 |
| $nC_4^0$ | 0.93 | 0.99 | 0.97 | 1.27 |
| $iC_4^0$ | 3.54 | 3.65 | 3.49 | 2.64 |
| $C_3^=$ | 5.63 | 5.67 | 4.25 | 3.41 |
| $\Sigma C_4^=$ | 4.28 | 4.15 | 3.01 | 2.49 |
| $iC_4^=$ | 1.24 | 1.22 | 0.75 | 0.67 |
| $C_5^+$ gasoline | 54.94 | 50.52 | 55.88 | 46.47 |
| coke | 2.29 | 2.22 | 2.83 | 2.43 |
| $C_5^+$ gasoline + alkylates wt % | 71.60 | 65.70 | 67.20 | 58.18 |
| $iC_4^0$ from other source wt % | 8.20 | 7.55 | 5.20 | 4.40 |

COMPARATIVE EXAMPLES 1–3

The performance characteristics of the three zeolite components based catalyst according to the invention were proved by comparing with the corresponding two zeolite components based catalysts.

The matrix used in the catalysts of comparative examples was the same as used in Examples 1–8.

The amounts of the two zeolites selected from HZSM-5, REY, and DASY that were used in the two zeolite components catalyst are listed in Table 3. The preparation of the catalysts were the same as mentioned in Examples 1–8.

The catalysts were deactivated under a condition of 790° C., and with 100% atmospheric steam for 17 hrs. The catalysts were tested in a bench-scale fixed-fluidized bed reactor using feed A as feedstock under reaction conditions of 500° C., WHSV of 14 hr$^{-1}$, cat./oil ratio of 4. The results are listed in Table 9.

COMPARATIVE EXAMPLE 4

The performance characteristics of the three zeolite components based catalyst according to the invention were further proved by comparing with a cracking catalyst having an added promoter that is extensively used in industry.

The cracking catalyst used was LWC-33 (REY type, commercial product of the Catalyst Plant of Lanzhou Refinery). The promoter used was prepared by using HZSN-5 zeolite, pseudo-boehmite, and halloysite. A conventional method was used for preparing a semisynthetic cracking catalyst including the steps of slurrying, mixing, homogenizing, and spray drying. The prepared promoter comprised 20 wt % HZSM-5, 15 wt % $Al_2O_3$, and 65 wt % clay.

TABLE 9

| catalyst | Example 1 | Comparative Example 1 | Comparative Example 2 | Comparative Example 3 |
|---|---|---|---|---|
| conversion, wt % | 88.01 | 86.53 | 85.31 | 81.62 |
| product yield, wt % | | | | |
| $H_2$—$C_2$ | 2.24 | 2.79 | 2.52 | 1.96 |
| $C_3^0$ | 1.88 | 2.70 | 2.50 | 1.72 |
| $nC_4^0$ | 1.34 | 1.82 | 1.74 | 1.31 |
| $iC_4^0$ | 7.08 | 8.28 | 8.23 | 6.21 |
| $C_3^=$ | 12.79 | 9.18 | 9.44 | 9.35 |
| $\Sigma C_4^=$ | 12.24 | 8.16 | 8.82 | 8.76 |
| $iC_4^=$ | 5.11 | 2.47 | 2.25 | 2.93 |
| $C_5^+$ gasoline | 45.21 | 46.91 | 45.14 | 47.59 |
| coke | 5.23 | 5.60 | 5.94 | 4.06 |
| $C_5^+$ gasoline + alkylates wt % | 96.39 | 83.45 | 83.55 | 85.66 |
| $iC_4^0$ from other sourc wt % | 22.00 | 12.84 | 13.94 | 15.75 |

TABLE 10

| catalyst | Example 1 | Comparative | Example 4 |
|---|---|---|---|
| reaction temp., °C. | 500 | 500 | 520 |
| conversion, wt % | 88.86 | 81.70 | 83.20 |
| product yield, wt % | | | |
| $H_2$—$C_2$ | 2.77 | 3.00 | 3.61 |
| $C_3$—$C_4$ | 30.12 | 20.40 | 21.49 |
| $C_3^=$ | 9.80 | 6.91 | 7.11 |
| $C_4^=$ | 11.85 | 8.42 | 9.61 |
| $C_5^+$ gasoline | 45.05 | 47.40 | 48.00 |
| 205–330° C. | 13.14 | 18.30 | 16.80 |
| coke | 8.52 | 10.90 | 10.10 |
| $C_5^+$ gasoline MON(clear) | 80.8 | 77.6 | 79.3 |
| induction period, min | 825 | 485 | 421 |

The comparison was made on a pilot riser unit using feed E containing 11.3 ppm Ni as feedstock, The comparison was based on the same amount of pentasil type zeolite in the reactor inventory for both catalyst of Example 1 (containing ZRP) and LWC-33 catalyst with added promoter (HZSM-5). The results were listed in Table 10.

EXAMPLES 9–11

A catalyst according to the invention was prepared using a semi-synthetic matrix and a pseudo-boehmite gel as binder. Its preparation and performance were as follows.

938 g halloysite was added to 2060 g decationized water followed by stirring homogeneously to prepare a slurry, in which 834 g pseudo-boehmite (solid content 30 wt %) was added with homogeneously stirring followed by aging at 70°±5° C. for 1 hr to obtain the slurry of matrix.

The zeolites HZRP, REY, and a high silica Y prepared according to the method described in Example 2 of CN 87107824.4 (dealumination by $NH_4BF_4$ in liquid phase) with a silica/alumina ratio of 13 were added respectively to decationized water according to a given proportion, followed by slurrying, homogenizing, mixing with the above-prepared matrix slurry, further homogenizing, spray drying, washing, and drying, to obtain the catalyst of the invention. The detail data was listed in Table 11.

The prepared catalyst was tested in a heavy oil—microreactor after being deactivated under a condition of 800° C. and 100% atmospheric steam for 8 hrs. Feed D was used as feedstock. The reaction conditions were a temperature of 500 ° C. WHSV of 16 hr$^{-1}$ and cat./oil ratio of 3. The results are listed in Table 12.

Comparative Example 5

The catalyst matrix used was the same as mentioned in Examples 9–11.

The amounts of REY and high silica Y (the preparation method was the same as mentioned in Examples 9–11) are listed in Table 11. The preparation method of the catalyst was the same as mentioned in Examples 9–11.

The prepared catalyst was evaluated in a heavy oil—microreactor after deactivation. The conditions for deactivation and evaluation were same as those in Examples 9–11. The results are listed in Table 12.

EXAMPLES 12–14

A catalyst according to the invention was prepared using a semi-synthetic matrix and a silica-alumina sol as binder. The preparation and performance of the catalyst was as follows.

567 g 20 wt % sulfuric acid solution was added to 120 g pure water 0.19 liter aluminum sulfate solution (the content of $Al_2O_3$ was 90 g/l) was further added while stirring homogeneously. After cooling to a temperature below 10° C., 2.36 liter water glass (with a $SiO_2$ content of 124 g/l and a modulus of 3.2–3.3) and 862 g halloysite were further added while stirring homogeneously to prepare the slurry of the matrix.

The zeolites HZRP, REY, and a high silica Y prepared according to the method described in Example 3 of U.S. Pat. No. 4,503,023 framework silicon-enriching and dealuminating process by $(NH_4)SiF_6$ in liquid phase) with a silica/alumina ratio of 12, were added respectively to decationized water according to a given proportion, followed by pastizing, homogenizing, mixing with above-prepared matrix slurry, further homogenizing, spray drying, washing, and drying, to obtain the catalyst according to the invention. The detail data are listed in Table 13.

TABLE 11

| Example | zeolite weight, g | decationized water weight, g | HZRP:REY:high silica Y weight ratio | zeolite content in catalyst wt % |
|---|---|---|---|---|
| 9 | 428 | 514 | 16.6:66.8:16.6 | 30 |
| 10 | 333 | 400 | 8.1:60.1:31.8 | 25 |
| 11 | 389 | 467 | 28.6:35.7:35.7 | 28 |
| Comparative 5 | 333 | 400 | 0:60.1:39.9 | 25 |

TABLE 12

| catalyst | Example 9 | Example 10 | Example 11 | Comparative Example 5 |
|---|---|---|---|---|
| conversion, wt % | 78.61 | 78.04 | 72.13 | 70.30 |
| product yield, wt % | | | | |
| $H_2$—$C_2$ | 0.96 | 1.12 | 0.87 | 0.71 |
| $C_3^0$ | 1.44 | 0.87 | 0.84 | 2.10 |
| $nC_4^0$ | 1.08 | 0.98 | 0.86 | 0.64 |
| $iC_4^0$ | 4.06 | 3.73 | 3.58 | 2.53 |
| $C_3=$ | 5.24 | 5.40 | 6.47 | 3.13 |
| $\Sigma C_4=$ | 3.59 | 4.20 | 5.02 | 2.26 |
| $iC_4=$ | 0.86 | 1.10 | 1.54 | 0.54 |
| $C_5^+$ gasoline | 59.39 | 59.27 | 52.34 | 56.90 |
| coke | 2.85 | 2.47 | 2.15 | 2.03 |
| $C_5^+$ gasoline + alkylates wt % | 73.69 | 73.25 | 70.63 | 64.45 |
| $iC_4^0$ from other source wt % | 6.96 | 7.64 | 9.96 | 4.13 |

TABLE 13

| Example | zeolite weight, g | decationized water weight, g | HZRP:REY:high silica Y weight ratio | zeolite content in catalyst wt % |
|---|---|---|---|---|
| 12 | 428 | 514 | 16.6:50.0:33.4 | 30 |
| 13 | 539 | 647 | 14.3:28.6:57.1 | 35 |
| 14 | 428 | 514 | 16.6:66.8:16.6 | 30 |

The prepared catalyst was evaluated in a heavy oil—microreactor after deactivation. The conditions of deactivation and evaluation were the same as mentioned in Examples 9–11. The results are listed in Table 14.

EXAMPLES 15–17

A catalyst according to the invention was prepared using a silica-alumina matrix prepared by co-gel method. The preparation and performance of the catalyst were as follows.

5.7 liter water glass (with a $SiO_2$ content of 124 g/l) was added to 6.1 liter decationized water while stirring homogeneously, 1.5 liter aluminum sulfate solution (with a $Al_2O_3$ content of 50 g/l) was slowly added and followed by aging for 30 min. 2.4 liter aluminum sulfate solution (with a $Al_2O_3$ content of 90 g/l) and 1.4 liter ammonia water (with a concentration of 150 g/l) were further added to the mixture subsequently, followed by stirring homogeneously to obtain the slurry of matrix.

The zeolites HZRP, REY, and DASY were added respectively to decationized water according to a given proportion, followed by slurrying, homogenizing, mixing with the above prepared matrix slurry, further homogenizing, spray drying, washing, and drying, to obtain the catalyst of the invention. The detail data are listed in Table 15.

TABLE 14

| catalyst | Example 12 | Example 13 |
|---|---|---|
| conversion, wt % | 62.91 | 69.18 |
| product yield, wt % | | |
| $H_2$—$C_2$ | 0.93 | 1.11 |
| $C_3^0$ | 0.16 | 0.16 |
| $nC_4^0$ | 0.89 | 0.93 |
| $iC_4^0$ | 2.80 | 3.25 |
| $C_3=$ | 5.15 | 4.79 |
| $\Sigma C_4=$ | 4.12 | 3.64 |
| $iC_4=$ | 1.24 | 1.08 |
| $C_5^+$ gasoline | 46.70 | 52.99 |
| coke | 2.16 | 2.31 |
| $C_5^+$ gasoline + alkylates, wt % | 62.60 | 66.00 |
| $iC_4^0$ from other source, wt % | 8.11 | 6.37 |

TABLE 15

| Example | zeolite weight, g | decationized water weight, g | HZRP:REY:DASY weight ratio | zeolite content in catalyst wt % |
|---|---|---|---|---|
| 15 | 428 | 514 | 16.6:66.8:16.6 | 30 |
| 16 | 333 | 400 | 8.1:60.1:31.8 | 25 |
| 17 | 389 | 467 | 28.6:35.7:35.7 | 28 |

The prepared catalyst was evaluated in a heavy oil—microreactor after deactivation, The conditions for deactivation and evaluation were the same as mentioned in Examples 9-11. The results were listed in Table 16.

EXAMPLES 18-20

The catalyst of the-invention with a synthesized silica-alumina matrix was prepared by stepwise precipitation method. The preparation and performance of the catalyst were as follows.

5.9 liter water glass (with a $SiO_2$ content of 124 g/l) was added to 5.1 liter decationized water while stirring homogeneously 0.9 liter 25 wt % sulfuric acid solution was then added slowly followed by homogeneously stirring and aging for 30 min. 1.4 liter aluminum sulfate solution (with a $Al_2O_3$ content of 90 g/l) and 0.7 liter sodium aluminate solution (with a $Al_2O_3$ content of 203 g/l) were further added to the mixture followed by stirring homogeneously to obtain the slurry of the matrix.

The zeolites HZRP, REY, and DASY were added respectively to decationized water according to a given proportion, followed by slurrying, homogenizing, mixing with the above prepared matrix slurry, further homogenizing, spray drying, washing, and drying, to obtain the catalyst of the invention. The detail data are listed in Table 17.

The prepared catalyst was evaluated in a heavy oil—microreactor after deactivation. The conditions for deactivation and evaluation were the same as mentioned in Examples 9-11. The results were listed in Table 18.

TABLE 16

| catalyst | Example 15 | Example 16 | Example 17 |
|---|---|---|---|
| conversion, wt % | 66.97 | 67.43 | 74.08 |
| product yield, wt % | | | |
| $H_2$—$C_2$ | 1.08 | 1.08 | 1.51 |
| $C_3^0$ | 1.39 | 1.24 | 1.56 |
| $nC_4^0$ | 0.89 | 0.81 | 0.96 |
| $iC_4^0$ | 3.06 | 2.88 | 3.61 |
| $C_3=$ | 4.88 | 4.81 | 8.43 |
| $\Sigma C_4=$ | 3.76 | 4.04 | 7.09 |
| $iC_4=$ | 1.32 | 1.43 | 2.76 |
| $C_5^+$ gasoline | 49.83 | 50.69 | 49.01 |
| coke | 2.08 | 1.88 | 1.91 |
| $C_5^+$ gasoline + alkylates, wt % | 63.95 | 64.78 | 74.42 |
| $iC_4^0$ from other source, wt % | 7.17 | 7.51 | 15.54 |

TABLE 17

| Example | zeolite weight, g | decationized water weight, g | HZRP:REY:DASY weight ratio | zeolite content in catalyst wt % |
|---|---|---|---|---|
| 18 | 428 | 514 | 16.6:66.8:16.6 | 30 |
| 19 | 333 | 400 | 8.1:60.1:31.8 | 25 |
| 20 | 389 | 467 | 28.6:35.7:35.7 | 28 |

TABLE 18

| catalyst | Example 18 | Example 19 | Example 20 |
|---|---|---|---|
| conversion, wt % | 71.46 | 68.09 | 65.11 |
| product yield, wt % | | | |
| $H_2$—$C_2$ | 0.86 | 0.94 | 0.86 |
| $C_3^0$ | 1.06 | 1.04 | 1.86 |
| $nC_4^0$ | 1.02 | 1.08 | 0.90 |
| $iC_4^0$ | 3.59 | 3.80 | 3.35 |
| $C_3=$ | 5.03 | 5.32 | 5.79 |
| $\Sigma C_4=$ | 3.69 | 3.90 | 4.25 |
| $iC_4=$ | 1.09 | 1.28 | 1.49 |
| $C_5^+$ gasoline | 54.21 | 50.17 | 46.23 |
| coke | 2.00 | 1.84 | 1.87 |
| $C_5^+$ gasoline + alkylates, wt % | 68.12 | 65.03 | 62.46 |
| $iC_4^0$ from other source, wt % | 6.79 | 7.18 | 8.55 |

As will be evident to those skilled in the art, various modifications of this invention can be made or followed in the light of the foregoing disclosure and discussion without departing from the spirit and scope of the disclosure or from the scope of the claims.

What is claimed is:

1. A catalyst for converting hydrocarbons into $C_3$ and $C_4$ olefins and gasoline which comprises:
   10–40 wt % of three zeolitic active components consisting of a rare-earth-containing high silica zeolite having the structure of pentasil (ZRP), a REY zeolite, and a high silica Y zeolite, based on the total weight of the catalyst; and
   a synthetic matrix or a semi-synthetic matrix containing 10–40 wt % (based on the total weight of the catalyst) of silica and/or alumina binder.

2. A catalyst according to claim 1, wherein said zeolite ZRP has an anhydrous chemical composition of the formula (based on the moles of the oxides): 0.01–0.30 $RE_2O_3$.0.4–1.0 $Na_2O.Al_2O_3$.20–60 $SiO_2$, a X-ray diffraction pattern listed in Table 1, a 2–4 times higher adsorption capacity ratio of normal hexane to cyclohexane comparing with ZSM-5, and a rare earth ingredient originated from a rare earth containing faujasite used as seed in the synthesis of the zeolite.

3. A catalyst according to claim 1, wherein the content of zeolites ZRP, REY, and the high silica Y in the total weight of the active components are respectively 3–50 wt %, 12–75 wt %, and 12–75 wt %.

4. A catalyst according to claim 1 or 2, wherein said ZRP zeolite is HZRP zeolite.

5. A catalyst according to claim 1, wherein said REY zeolite contains 5–19 wt % (calculated as oxide) rare earth and is prepared by ion exchange.

6. A catalyst according to claim 1, wherein said high silica Y zeolite with a silica/alumina ratio of 8–15 or higher is prepared and stabilized by various chemical and/or physical methods.

7. A catalyst according to claim 1, wherein said synthetic matrix is an amorphous silica-alumina or silica-magnesia matrix with a $SiO_2$ content of no more than 70 wt % and prepared by a cogel method or a stepwise precipitation method.

8. A catalyst according to claim 1, wherein the binder used in said semi-synthetic matrix is selected from $Al_2O_3$, or $SiO_2$, or $SiO_2.Al_2O_3$.

9. A catalyst according to claim 1, wherein the clay used in said semi-synthetic matrix is kaolin or halloysite.

10. A catalyst for converting hydrocarbons comprising 10–40% of an active component, wherein the active component consists of a rare-earth-containing high silica zeolite having the structure of pentasil (ZRP), a REY zeolite, and a high silica Y zeolite.

11. The catalyst according to claim 10 further including a matrix containing 10–40 wt % of silica and/or alumina binder.

12. A catalyst according to claim 10, wherein the content of zeolites ZRP, REY, and the high silica Y in the total weight of the active components are respectively 3–50 wt %, 12–75 wt %, and 12–75 wt %.

13. A catalyst according to claim 10, wherein said zeolite ZRP has an anhydrous chemical composition of the formula (based on the moles of the oxides): 0.01–0.30 $RE_2O_3$.0.4–1.0 $Na_2O.Al_2O_3$.20–60 $SiO_2$, and has an x-ray diffraction pattern listed in Table 1.

14. A catalyst according to claim 10, wherein the rare earth content of said REY zeolite is 5–9 wt % (calculated as oxide).

15. A catalyst according to claim 10, wherein said high silica Y zeolite has a silica/alumina ratio of 8–15 or higher.

16. A catalyst for converting hydrocarbons comprising:
  (1) 10–40% of an active component consisting of:
    (a) 3–50 wt % a rare-earth-containing high silica zeolite characterized by having the structure of pentasil (ZRP), and an anhydrous chemical composition of the formula (based on the moles of the oxides): 0.01–0.30 $RE_2O_3$.0.4–1.0 $Na_2O.Al_2O_3$.20–60 $SiO_2$,
    (b) 12–75 wt % a REY zeolite wherein the rare earth content is 5–19 wt % (calculated as oxide),
    (c) 12–75 wt % a high silica Y zeolite with a silica/alumina ratio of at least 8; and
  (2) a matrix containing 10–40 wt % of silica and/or alumina binder.

17. A catalyst according to claim 16, wherein said matrix is a synthetic amorphous silica-alumina or silica-magnesia matrix with a $SiO_2$ content of no more than 70 wt %.

18. A catalyst according to claim 16, wherein said matrix is a semi-synthetic matrix having a binder selected from $Al_2O_3$, or $SiO_2$, or $SiO_2.Al_2O_3$.

19. A catalyst according to claim 16, wherein said matrix is a semi-synthetic matrix including kaolin clay or halloysite clay.

* * * * *

UNITED STATES PATENT AND TRADEMARK OFFICE
CERTIFICATE OF CORRECTION

PATENT NO. : 5,358,918
DATED : October 25, 1994
INVENTOR(S) : Lu Yukang et al.

Page 1 of 6

It is certified that error appears in the above-indentified patent and that said Letters Patent is hereby corrected as shown below:

In column 1, line 19, delete "carl" and substitute --can--.

In column 1, line 25, delete "can not" and substitute --cannot--.

In column 1, line 26, please begin a new paragraph at "For".

In column 1, line 33, delete "the".

In column 1, line 33, after "promoter" insert --to a--.

In column 1, line 34, delete "to a".

In column 1, line 37, delete "$C_4$olefin" and substitute --$C_4$ olefin--.

In column 1, line 44, delete "97.5" and substitute --97.3--.

In column 1, line 44, delete the last "," and substitute --.--

In column 1, line 45, please begin a new paragraph at "U.S.".

In column 1, lines 46 and 47, delete "imbeded" and substitute --embedded--.

UNITED STATES PATENT AND TRADEMARK OFFICE
CERTIFICATE OF CORRECTION

PATENT NO. : 5,358,918
DATED : October 25, 1994
INVENTOR(S) : Lu Yukang et al.

It is certified that error appears in the above-indentified patent and that said Letters Patent is hereby corrected as shown below:

In column 1, line 50, delete "ZSH-5" and substitute --ZSM-5--.

In column 1, line 53, delete "ZSM-S" and substitute --ZSM-5--.

In column 2, line 15, delete "Zn" and substitute --In--.

In column 2, line 41, after "addition" insert --,--.

In column 2, line 52, delete "contain" and substitute --contains--.

In column 2, line 59, delete ".." and substitute --.--.

In column 2, line 62, delete "A" and substitute --Å--.

In column 2, line 66, delete "sillca" and substitute --silica--.

In column 3, line 14, after "washing" insert --,--.

In column 3, line 57, delete "semisynthetic" and substitute --semi-synthetic--.

UNITED STATES PATENT AND TRADEMARK OFFICE
CERTIFICATE OF CORRECTION

PATENT NO. : 5,358,918
DATED : October 25, 1994
INVENTOR(S) : Lu Yukang et al.

It is certified that error appears in the above-indentified patent and that said Letters Patent is hereby corrected as shown below:

In column 4, line 10, delete "." and substitute --,--.

In column 4, line 15, delete "good and" and substitute --and good--.

In column 4, line 32, delete "gradually ," and substitute --gradually,--.

In column 5, line 1, delete "(".

In column 5, line 5, delete "examples), REY," and substitute --examples. The REY--.

In column 5, line 6, after DASY insert --zeolites--.

In column 5, line 6, delete "(both were" and substitute --were both--.

In column 5, line 7, after "Corporation" insert --.--.

In column 5, line 9, delete ")".

In column 5, line 15, before "part" insert --A--.

UNITED STATES PATENT AND TRADEMARK OFFICE
CERTIFICATE OF CORRECTION

PATENT NO. : 5,358,918
DATED : October 25, 1994
INVENTOR(S) : Lu Yukang et al.

It is certified that error appears in the above-indentified patent and that said Letters Patent is hereby corrected as shown below:

In column 5, line 26, after "stocks" insert --:--.

In column 5, line 28, before the first occurrence of "feed" insert --(3)--.

In column 5, line 28, after "E" delete "(3)".

In column 5, line 28, after "nickel" insert --,--.

In column 5, line 34, delete "$hr^1$" and substitute --$hr^-1$--.

In column 5, line 35, after "C." delete ",".

In column 5, line 41, after "C." insert --,--.

In column 5, line 41, delete "$hr^{-1}$" and substitute --$hr^{-1}$,--.

In column 5, line 43, after "C." insert --,--.

In column 5, line 44, delete "hrs," and substitute --hrs.--.

UNITED STATES PATENT AND TRADEMARK OFFICE
CERTIFICATE OF CORRECTION

PATENT NO. : 5,358,918
DATED : October 25, 1994
INVENTOR(S) : Lu Yukang et al.

It is certified that error appears in the above-indentified patent and that said Letters Patent is hereby corrected as shown below:

In column 5, line 55, delete ", after that".

In column 8, Table 9, in the second to the last line, delete "sourc" and substitute --source--.

In column 8, line 63, after "feedstock" delete "," and substitute --.--.

In column 9, line 29, delete "was" and substitute --are--.

In column 9, line 65, after "water" insert --.--.

In column 9, line 66, delete "A1203" and substitute --$Al_2O_3$--.

In column 10, line 59, after "a" insert --synthetic--.

In column 11, line 41, after "deactivation" delete "," and substitute --.--.

In column 11, line 43, delete "were" and substitute --are--.

In column 11, line 46, delete "the-invention" and substitute --the invention--.

UNITED STATES PATENT AND TRADEMARK OFFICE
CERTIFICATE OF CORRECTION

PATENT NO. : 5,358,918
DATED : October 25, 1994
INVENTOR(S) : Lu Yukang et al.

It is certified that error appears in the above-indentified patent and that said Letters Patent is hereby corrected as shown below:

In column 11, line 52, after "homogeneously" insert --.--.

In column 11, line 53, after "slowly" insert --,--.

In column 12, line 2, delete "were" and substitute --are--.

Column 14, claim 14, line 2, delete "5-9" and substitute --5-19--.

Signed and Sealed this

Twentieth Day of February, 1996

Attest:

BRUCE LEHMAN

*Attesting Officer*   *Commissioner of Patents and Trademarks*